(12) United States Patent
Tanikawa et al.

(10) Patent No.: US 7,864,413 B2
(45) Date of Patent: Jan. 4, 2011

(54) EXAMINATION APPARATUS WITH MULTIPLE IMAGE ACQUISITION DEVICES

(75) Inventors: Yoshihisa Tanikawa, Tokyo (JP);
Tomoaki Sato, Higashi-yamato (JP);
Ikuko Sakai, Tachikawa (JP)

(73) Assignee: Olympus Corporation, Tokyo (JP)

( * ) Notice: Subject to any disclaimer, the term of this patent is extended or adjusted under 35 U.S.C. 154(b) by 712 days.

(21) Appl. No.: 11/840,449

(22) Filed: Aug. 17, 2007

(65) Prior Publication Data

US 2008/0049309 A1 Feb. 28, 2008

(30) Foreign Application Priority Data

Aug. 25, 2006 (JP) .............................. 2006-229722

(51) Int. Cl.
*G02B 21/36* (2006.01)
(52) U.S. Cl. ........................ 359/369; 359/368; 359/554; 250/201.8; 250/215
(58) Field of Classification Search ........................ None
See application file for complete search history.

(56) References Cited

U.S. PATENT DOCUMENTS 7,126,699 B1 * 10/2006 Wihl et al. .................. 356/625
7,232,980 B2 * 6/2007 Oshiro et al. ............. 250/201.3
7,304,790 B2 * 12/2007 Kawano et al. ............. 359/383
7,473,877 B2 * 1/2009 Fomitchov ................ 250/201.2

FOREIGN PATENT DOCUMENTS

JP 07253548 10/1995

* cited by examiner

*Primary Examiner*—Arnel C Lavarias
(74) *Attorney, Agent, or Firm*—Pillsbury Winthrop Shaw Pittman, LLP

(57) ABSTRACT

An examination apparatus that observes a specimen in a stationary state while suppressing the blurring caused by a control delay. The apparatus includes a first optical system and a second optical system for imaging light produced in a specimen, a first image-acquisition unit with a plurality of first image-acquisition devices for detecting an image formed by the first optical system, a second image-acquisition unit with a second image-acquisition device for acquiring an image formed by the second optical system, and a driving unit that causes the images to be formed at the same position in the second image-acquisition unit. The value obtained by dividing the pixel size Y of the first image-acquisition devices by the magnification X of the first optical system is smaller than the value obtained by dividing the pixel size Y' of the second image-acquisition device by the magnification X' of the second optical system.

3 Claims, 11 Drawing Sheets

EXAMINATION APPARATUS WITH MULTIPLE IMAGE ACQUISITION DEVICES

BACKGROUND OF THE INVENTION

1. Field of the Invention

The present invention relates to examination apparatuses, and more particularly, relates to an examination apparatus for examining a small animal, such as a mouse or rat.

This application is based on Japanese Patent Application No. 2006-229722, the content of which is incorporated herein by reference.

2. Description of Related Art

Conventionally, in-vivo examination of tissue inside a living organism has been carried out by making a large incision in the organism to expose the site to be examined or by excising tissue including the site to be examined.

When examining a living organism, a motorized stage is operated to position the specimen at the center of the observation field while the observer observes an image of the specimen.

Examination apparatuses configured to automatically control the motorized stage such that the specimen is positioned at the center of the observation field have been proposed.

There has been proposed an examination apparatus configured to automatically adjust a specimen image to the center of the field of view of a microscope by controlling the movement of a motorized stage by comparing image data of the specimen captured by a video camera with reference image data to detect the movement of the specimen (for example, see Japanese Unexamined Patent Application, Publication No. HEI-07-253548).

However, an examination apparatus using an image-acquisition device such as a single video camera or Charge Coupled Device (CCD) is insufficient for examining fluorescence produced in the specimen. In other words, it is difficult to acquire a bright fluorescence image as well as to detect the motion of the specimen using a single image-acquisition device; separate image-acquisition devices are required for image acquisition and for position detection, respectively.

With the examination apparatus using separate image-acquisition devices for image acquisition and position detection described above, since image blurring occurs due to a control delay in the motorized stage and so on, there is a problem in that it is difficult to obtain a stationary image of the specimen.

BRIEF SUMMARY OF THE INVENTION

The present invention has been conceived to solve the above-described problems, and an object thereof is to provide an examination apparatus capable of examining a specimen in a stationary state while suppressing blurring due to a control delay.

In order to realize the above object, the present invention provides the following solutions.

The present invention provides an examination apparatus including a first optical system and a second optical system configured to image light produced in a specimen; a first image-acquisition unit provided with a plurality of first image-acquisition devices configured to detect an image formed by the first optical system; a second image-acquisition unit provided with a second image-acquisition device configured to acquire an image formed by the second optical system; and a driving unit configured to cause the image to be formed at substantially the same position in the second image-acquisition unit based on a detection signal of the first image-acquisition unit, wherein a magnification X of the first optical system, a magnification X' of the second optical system, a pixel size Y of the first image-acquisition devices, and a pixel size Y' of the second image-acquisition device satisfy expression (1) below:

According to the present invention, when the image of the specimen moves from one of the first image-acquisition devices to another first image-acquisition device, the detection signal output from the original first image-acquisition device disappears, and a new detection signal is output from the other first image-acquisition device. The driving unit can detect the movement of the specimen based on these changes in the detection signal.

When the image of the specimen moves from one of the first image-acquisition devices to another first image-acquisition device, the driving unit can control the image-forming position of the image at the second image-acquisition unit based on the movement of the detected specimen. At this time, since the magnification X of the first optical system, the magnification X' of the second optical system, the pixel size Y of the first image-acquisition devices, and the pixel size Y' of the second image-acquisition device satisfy expression (1) above, the driving unit can control the image so that it does not move out of the second image-acquisition device. Accordingly, the second image-acquisition device can acquire the image of the specimen in a stationary state.

In other words, because the value obtained by dividing the pixel size Y of the first image-acquisition devices by the magnification X of the first optical system is smaller than the value obtained by dividing the pixel size Y' of the second image-acquisition device by the magnification X' of the second optical system, the driving unit can control the image so that it does not move out of the second image-acquisition device.

According to the present invention, it is preferable that the magnification of the first optical system and the magnification of the second optical system be substantially the same; and the pixel size of the first image-acquisition devices be smaller than the pixel size of the second image-acquisition device.

In this way, the magnification X of the first optical system and the magnification X' of the second optical system are substantially the same, and the pixel size Y of the first image-acquisition devices is smaller than the pixel size Y' of the second image-acquisition device, thus satisfying expression (1) below. Accordingly, the driving unit can control the image so that it does not move out of the second image-acquisition device. Therefore, the second image-acquisition device can acquire the image of the specimen in a stationary state.

In the above configuration, it is preferable that the first image-acquisition unit acquire the image by shifting positions of the first image-acquisition devices.

In this way, by acquiring the image with the first image-acquisition unit while shifting the position of the first image-acquisition devices, the pixel size of the first image-acquisition devices can be made smaller than that of the second image-acquisition device. In other words, in the first image-acquisition unit, it is possible to reduce the pixel size of the first image-acquisition devices compared to the second image-acquisition device by performing so-called pixel shifting.

In this state, before the image on one of the second image-acquisition devices moves to another second image-acquisition device, the image on one of the first image-acquisition device moves to another first image-acquisition device. Accordingly, based on the detection signal of the first image-acquisition unit, the driving unit can prevent the image from moving from one of the second image-acquisition devices to another second image-acquisition device. As a result, the second image-acquisition unit can acquire an image of the specimen in a stationary state.

According to the present invention, it is preferable that the pixel size of the first image-acquisition devices and the pixel size of the second image-acquisition device be substantially the same; and the magnification of the first optical system be larger than the magnification of the second optical system.

In this way, the pixel size Y of the first image-acquisition devices and the pixel size Y' of the second image-acquisition device are substantially the same, and the magnification X of the first optical system is larger than the magnification X' of the second optical system, thus satisfying expression (1) below. Accordingly, the driving unit can control the image so that it does not move out of the second image-acquisition device. Therefore, the second image-acquisition device can acquire the image of the specimen in a stationary state.

According to the present invention, it is preferable that an objective lens system be disposed facing the specimen; and the driving unit control the position of the image formed on the second image-acquisition unit by driving and controlling the position of the objective lens system.

In this way, by driving and controlling the position of the objective lens system, the driving unit controls the position of the image formed on the second image-acquisition unit, thus allowing the specimen to be examined in a stationary state while suppressing blurring.

Specifically, the driving unit drives and controls the position of the objective lens system by calculating the movement of the specimen based on the detection signal of the first image-acquisition unit, thus allowing the position of the image on the second image-acquisition unit to be controlled. In other words, the driving unit drives and controls the position of the objective lens system so as to cancel out the calculated amount of movement of the specimen, thus causing the image to be formed at substantially the same position at the second image-acquisition unit, even if the specimen moves.

According to the present invention, it is preferable that the pixel size of the first image-acquisition devices and the pixel size of the second image-acquisition device be substantially the same; the magnification of the first optical system be larger than the magnification of the second optical system; a second image-forming lens for forming the image be provided in the second image-acquisition unit; and the driving unit control the position of the image formed on the second image-acquisition unit by driving and controlling the position of the second image-forming lens.

In this way, the driving unit drives and controls the position of the second image-forming lens based on the detection signal of the first image-acquisition unit, thus allowing the position of the image formed on the second image-acquisition unit to be controlled. As a result, based on the detection signal of the first image-acquisition unit, the driving unit can cause the image to be formed at substantially the same position of the second image-acquisition unit. Accordingly, the second image-acquisition unit can acquire the specimen in a stationary state while suppressing blurring.

According to the present invention, it is preferable that the pixel size of the first image-acquisition devices and the pixel size of the second image-acquisition device be substantially the same, the magnification of the first optical system be larger than that of the second optical system, and the driving unit control the position of the image formed on the second image-acquisition unit by driving and controlling the position of the second image-acquisition unit.

In this way, because the driving unit drives and controls the position of the second image-acquisition unit based on the detection signal of the first image-acquisition unit, it is possible to control the position of the image formed on the second image-acquisition unit. As a result, based on the detection signal of the first image-acquisition unit, the driving unit can cause the image to be formed at substantially the same position of the second image-acquisition unit. Accordingly, the second image-acquisition unit can acquire the specimen in a stationary state while suppressing blurring.

According to the present invention, it is preferable that a first device region formed of one of the plurality of the first image-acquisition devices, and another first image-acquisition device adjacent to the first region be defined in the first image-acquisition unit; a second device region formed of a plurality of the second image-acquisition devices be defined in the second image-acquisition unit; a pixel size in the first device region be the pixel size Y, and a pixel size in the second device region be the pixel size Y'; and when the image move from the first device region to the other first image-acquisition device in the first image-acquisition unit, the driving unit control the position of the image in the second image-acquisition unit.

In this way, when the image moves from the first device region to another first image-acquisition device, the detection signal output from one of the first image-acquisition devices in the first device region disappears, and a new detection signal is output from the other first image-acquisition device. Because the value obtained by dividing the pixel size Y of the first device region by the magnification X of the first optical system is smaller than the value obtained by dividing the pixel size Y' of the second device region by the magnification X' of the second optical system, the driving unit can control the image so that it does not move out of the second device region. The second device region outputs a single luminance value based on a luminance of the image acquired by the plurality of the second image-acquisition devices. Accordingly, the second image-acquisition unit can acquire the specimen in a stationary state while suppressing blurring.

With the examination apparatus according to the present invention, because the value obtained by dividing the pixel size Y of the first image-acquisition devices by the magnification X of the first optical system is smaller than the value obtained by dividing the pixel size Y' of the second image-acquisition device by the magnification X' of the second optical system, the driving unit can control the image so that it does not move out of the second image-acquisition device, which affords an advantage in that it is possible to examine the specimen in a stationary state while suppressing blurring.

DETAILED DESCRIPTION OF THE INVENTION

First Embodiment

An examination apparatus according to a first embodiment of the present invention will be described below with reference to FIGS. 1 to 4.

Figure 1:
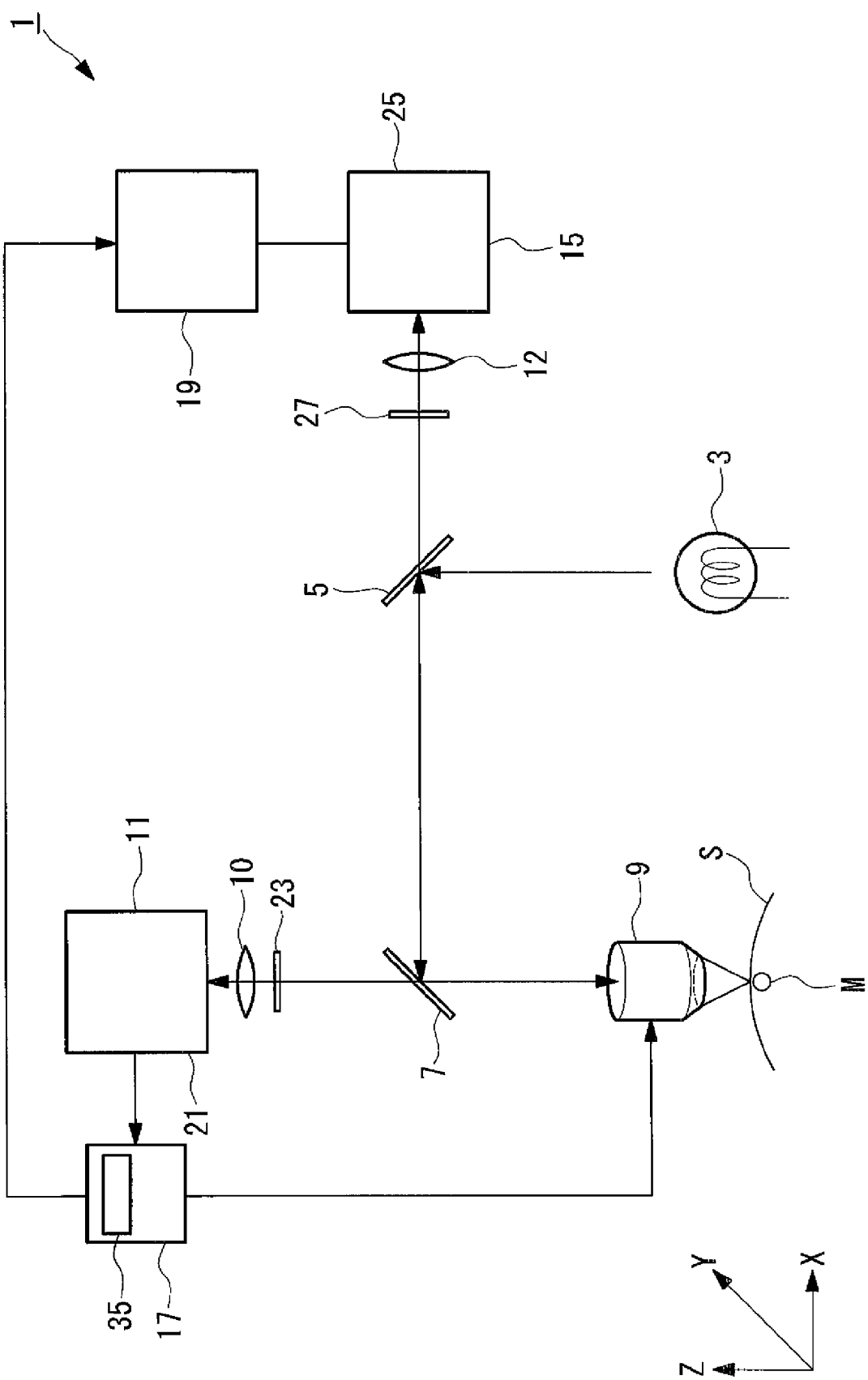
FIG. 1 is a schematic diagram showing the configuration of an examination apparatus according to a first embodiment of the present invention.

FIG. 1 is a schematic diagram explaining the configuration of an examination apparatus 1 according to this embodiment.

As shown FIG. 1, the examination apparatus 1 includes a light source 3, a first dichroic mirror 5, a second dichroic mirror 7, an objective lens system (first optical system, second optical system) 9, a first image-forming lens system (first optical system) 10, a first image-acquisition unit 11, a second image-forming lens system (second optical system) 12, a second image-acquisition unit 15, a driving control unit (driving unit) 17, and a display unit 19.

The light source 3 emits illumination light, toward the first dichroic mirror 5, for generating fluorescence from a specimen S and a marker M.

The first dichroic mirror 5 reflects the illumination light which is incident from the light source 3 toward the second dichroic mirror 7 and transmits reflected light incident from the second dichroic mirror 7 to make the reflected light incident on the second image-acquisition unit 15.

The second dichroic mirror 7 reflects the illumination light which is incident from the first dichroic mirror 5 toward the objective lens system 9. On the other hand, the second dichroic mirror 7 transmits part of the reflected light which is incident from the objective lens system 9 and makes it incident on the first image-acquisition unit 11, and reflects the rest and makes it incident on the first dichroic mirror 5.

The objective lens system 9 irradiates the specimen S with the incident illumination light and emits the reflected light from the specimen S to the second dichroic mirror 7. The position of the objective lens system 9 in the X-axis direction and the Y-axis direction in FIG. 1 is controlled by the driving control unit 17.

A known microscope objective lens may be used here, or when examining the interior of a living organism an objective lens having a narrow tip may be used, as required.

The first image-forming lens system 10 is a lens system for imaging fluorescence produce in the specimen S and the marker M onto the first image-acquisition unit 11. The first image-forming lens system 10 is disposed between the second dichroic mirror 7 and the first image-acquisition unit 11. In other words, the light emitted from the second dichroic mirror 7 is incident on the first image-forming lens system 10, and the light emitted from the first image-forming lens system 10 is incident on the first image-acquisition unit 11.

The first image-forming lens system 10 is not particularly limited; any known lens system may be used so long as it has the same magnification as the second image-forming lens system 12 described later.

Figure 2:
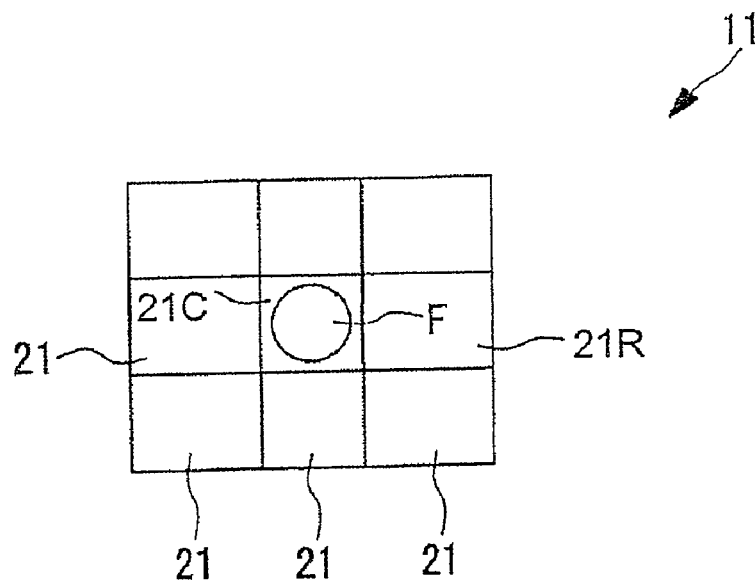
FIG. 2 is a diagram for explaining the placement of first image-acquisition devices in a first image-acquisition unit in FIG. 1.

FIG. 2 is a diagram for explaining the placement of first image-acquisition devices 21 in the first image-acquisition unit in FIG. 1.

The first image-acquisition unit 11 acquires an image of fluorescence produced in the specimen S and detects the motion of the fluorescence image of the specimen S formed on the first image-acquisition unit 11. As shown in FIG. 2, the first image-acquisition unit 11 includes a plurality of first image-acquisition devices 21, such as CCDs (Charge Coupled Devices). The outputs from the first image-acquisition devices 21 are input to the driving control unit 17. To simplify the description, in this embodiment, nine of the first image-acquisition devices 21 are arranged in the form of a matrix.

FIG. 2 shows a state in which an image of the marker M, described later, is formed at the center of a first image-acquisition device 21C of the first image-acquisition unit 11.

The pixel size of the first image-acquisition devices 21 should be smaller than that of a second image-acquisition device 25, and the number or type thereof is not limited.

For example, the number of the first image-acquisition devices 21 is not limited to nine as described above; more or less than nine may be provided.

In addition, the type of the first image-acquisition devices 21 is not limited; it may be any known type of image-acquisition device, such as the CCD described above, a CMOS (Complementary Metal Oxide Semiconductor) device, and so forth.

As shown in FIG. 1, a first absorption filter 23 is disposed between the first image-acquisition unit 11 and the second dichroic mirror 7. Of the reflected light incident on the first image-acquisition unit 11, the first absorption filter 23 absorbs light of a predetermined wavelength, for example, the illumination light emitted from the light source 3, and transmits light of other wavelengths, for example, the fluorescence emitted from the specimen S and so on.

The second image-forming lens system 12 is a lens system for imaging the fluorescence produced in the specimen S and the marker M onto the second image-acquisition unit 15. The second image-forming lens system 12 is disposed between the first dichroic mirror 5 and the second image-acquisition unit 15. In other words, the light emitted from the second dichroic mirror 7 is incident on the second image-forming lens system 12, and the light emitted from the second image-forming lens system 12 is incident on the second image-acquisition unit 15.

The second image-forming lens system 12 is not particularly limited; any known lens system may be used so long as it has the same magnification as the first image-forming lens system 10 described above.

Figure 3:
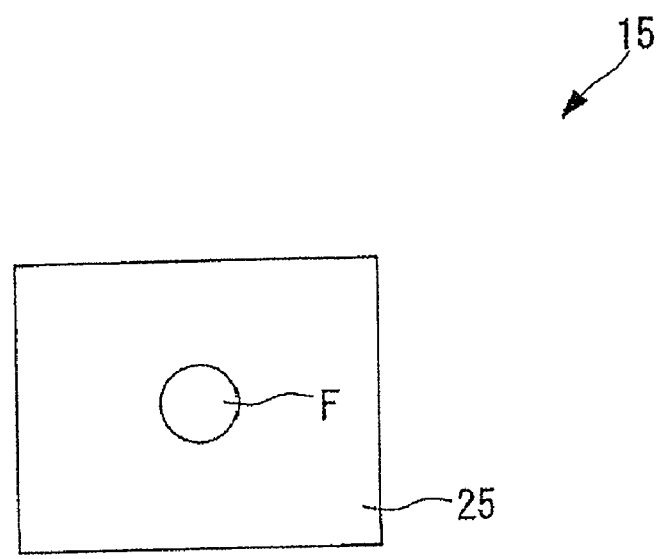
FIG. 3 is a diagram for explaining the placement of a second image-acquisition device in a second image-acquisition unit in FIG. 1.

FIG. 3 is a diagram for explaining the placement of the second image-acquisition device 25 in the second image-acquisition 15 unit in FIG. 1.

The second image-acquisition unit 15 acquires the reflected light from the specimen S; that is, it acquires an image of the specimen S.

As shown in FIG. 3, the second image-acquisition unit 15 includes the second image-acquisition device 25, such as a CCD. The output from the second image-acquisition device 25 is input to the display unit 19. To simplify the description, in this embodiment, a single second image-acquisition device 25 is provided; however, a plurality of second image-acquisition devices 25 may be arranged in the form of a matrix.

FIG. 3 shows a state in which an image of the marker M, described later, is formed at the center of the second image-acquisition device 25 of the second image-acquisition unit 15.

The pixel size of the second image-acquisition device 25 should be larger than that of the first image-acquisition devices 21, and the number or type thereof is not limited.

For example, the number of the second image-acquisition devices 25 is not limited to one as described above; more than one may be provided.

In addition, the type of the second image-acquisition device 25 is not limited; it may be any known type of image-acquisition device, such as the CCD described above, a CMOS (Complementary Metal Oxide Semiconductor) device, and so forth.

As shown in FIG. 1, a second absorption filter 27 is disposed between the second image-acquisition unit 15 and the first dichroic mirror 5. Of the reflected light incident on the second image-acquisition unit 15, the second absorption filter 27 absorbs light of a predetermined wavelength, for example, the illumination light emitted from the light source 3, and transmits light of other wavelengths, for example, the fluorescence produced in the specimen S.

Now, the relationship between a magnification and a pixel size at the first image-acquisition unit 11 and the second image-acquisition unit 15, which is a feature of this embodiment, will be described.

The magnification X1 of the image of the specimen S and the marker M formed on the first image-acquisition unit 11, the magnification X1' of the image of the specimen S and the marker M formed on the second image-acquisition unit 15, the pixel size Y1 of the first image-acquisition devices 21 in the first image-acquisition unit 11, and the pixel size Y1' of the second image-acquisition device 25 in the second image-acquisition unit 15 are set so as to satisfy expression (2) below.

Specifically, the magnification X1 is the magnification of the optical system formed of the objective lens system 9 and the first image-forming lens system 10, and the magnification X1' is the magnification of the optical system formed of the objective lens system 9 and the second image-forming lens system 12. Here, the objective lens system 9 is shared, and the magnifications of the first image-forming lens system 10 and the second image-forming lens system 12 are set to be the same, as described above. Accordingly, the magnification X1 is equal to the magnification X1' in this embodiment.

On the other hand, as described above, the pixel size Y1 of the first image-acquisition devices 21 is set smaller than the pixel size Y1' of the second image-acquisition device 25.

Accordingly, in this embodiment, the magnification X1, the magnification X1', the pixel size Y1, and the pixel size Y1' are set so as to satisfy expression (2) above.

The driving control unit 17 drives and controls the position of the objective lens system 9 in the X-axis and Y-axis directions in FIG. 1 based on an output from the first image-acquisition unit 11. The outputs from the first image-acquisition devices 21 of the first image-acquisition unit 11 are input to the driving control unit 17. The driving control unit 17 outputs a control status of the objective lens system 9 to the display unit 19.

The display unit 19 displays the fluorescence image of the specimen S acquired by the second image-acquisition unit 15, as well as the control status and so on of the driving control unit 17. An output from the second image-acquisition device 25 of the second image-acquisition unit 15 and the output from the driving control unit 17 are input to the display unit 19.

Next, the operation of the examination apparatus 1 having the above configuration will be described.

Markers M for generating fluorescence are distributed on the specimen S before acquiring the fluorescence image of the specimen S using the examination apparatus 1. This embodiment is described in terms of a case in which the markers M are beads that generate fluorescence. The markers M preferably include beads with different diameters, for example, beads with diameters of 9 μm and 3 μm. This is so that beads of a suitable size for controlling the image-forming position of the fluorescence image can be selected as the markers M when the observation magnification of the specimen S is changed.

The markers M are attached to the specimen S using a medium such as collagen or the like. Any biocompatible medium having a low viscosity at low temperatures and a high viscosity at high temperatures may be used for the medium.

In addition, the markers M are not particularly limited; a plurality of beads with different diameters may be used, as in the embodiment described above, or other concentric spherical beads may be used.

When acquiring the fluorescence image of the specimen S, first, the illumination light is emitted toward the first dichroic mirror 5 from the light source 3. The illumination light incident on the first dichroic mirror 5 is reflected towards the second dichroic mirror 7. The illumination light incident on the second dichroic mirror 7 is reflected towards the objective lens system 9. The illumination light incident on the objective lens system 9 irradiates the specimen S and the marker M.

The specimen S and the marker M irradiated with the illumination light each generate fluorescence. The fluorescence is incident on the objective lens system 9 and is incident on the second dichroic mirror 7. The second dichroic mirror 7 transmits part of the fluorescence and reflects the rest.

The fluorescence transmitted through the second dichroic mirror 7 is incident on the first absorption filter 23. The first absorption filter 23 absorbs part of the incident fluorescence and transmits the rest of the fluorescence. The fluorescence transmitted through the first absorption filter 23 is incident on the first image-acquisition unit 11 via the first image-forming lens system 10.

On the other hand, the fluorescence reflected from the second dichroic mirror 7 is incident on the first dichroic mirror 5. The first dichroic mirror 5 transmits the incident fluorescence. The transmitted fluorescence is incident on the second absorption filter 27, and part of the fluorescence is absorbed in the second absorption filter 27. The rest of the fluorescence passes through the second absorption filter 27 and is incident on the second image-acquisition unit 15 via the second image-forming lens system 12.

The fluorescence image of the specimen S and the marker M is formed on the first image-acquisition unit 11 by the first image-forming lens system 10. FIG. 2 shows a state in which the fluorescence image F of the marker M is formed at the center of the first image-acquisition device 21C. On the other hand, the fluorescence image of the specimen S and the marker M is formed on the second image-acquisition unit 15 by the second image-forming lens system 12. FIG. 3 shows a state in which the fluorescence image (image) F of the marker M is formed on the second image-acquisition device 25.

Now, a method for controlling an image-forming position of the fluorescence image at the second image-acquisition unit 15 using the driving control unit 17 will be described.

As shown in FIG. 1, when the specimen S moves, the marker M attached to the specimen S moves together therewith. When the marker M moves, the fluorescence image F of the marker M formed on the first image-acquisition unit 11 also moves. For example, when the fluorescence image F formed on the first image-acquisition device 21C at the center moves onto the first image-acquisition device 21R at the right side, a detection signal output from the first image-acquisition device 21C disappears, and a new detection signal is output from the first image-acquisition device 21R.

These detection signals from the first image-acquisition devices 21C and 21R are input to the driving control unit 17. The driving control unit 17 controls the position of the objective lens system 9 based on the input detection signals. Specifically, the driving control unit 17 calculates the moving direction of the specimen S based on the change in the input detection signals. Then, based on the calculated moving direction of the specimen S, the driving control unit 17 controls the position of the objective lens system 9 in the X-axis and Y-axis directions so that the fluorescence image F of the specimen S is positioned at substantially the center of the first image-acquisition unit 11 and the second image-acquisition unit 15. Accordingly, the fluorescence image of the specimen S does not move from the second image-acquisition device 25.

Next, a method for displaying the fluorescence image acquired by the second image-acquisition unit 15 will be described.

Figure 4:
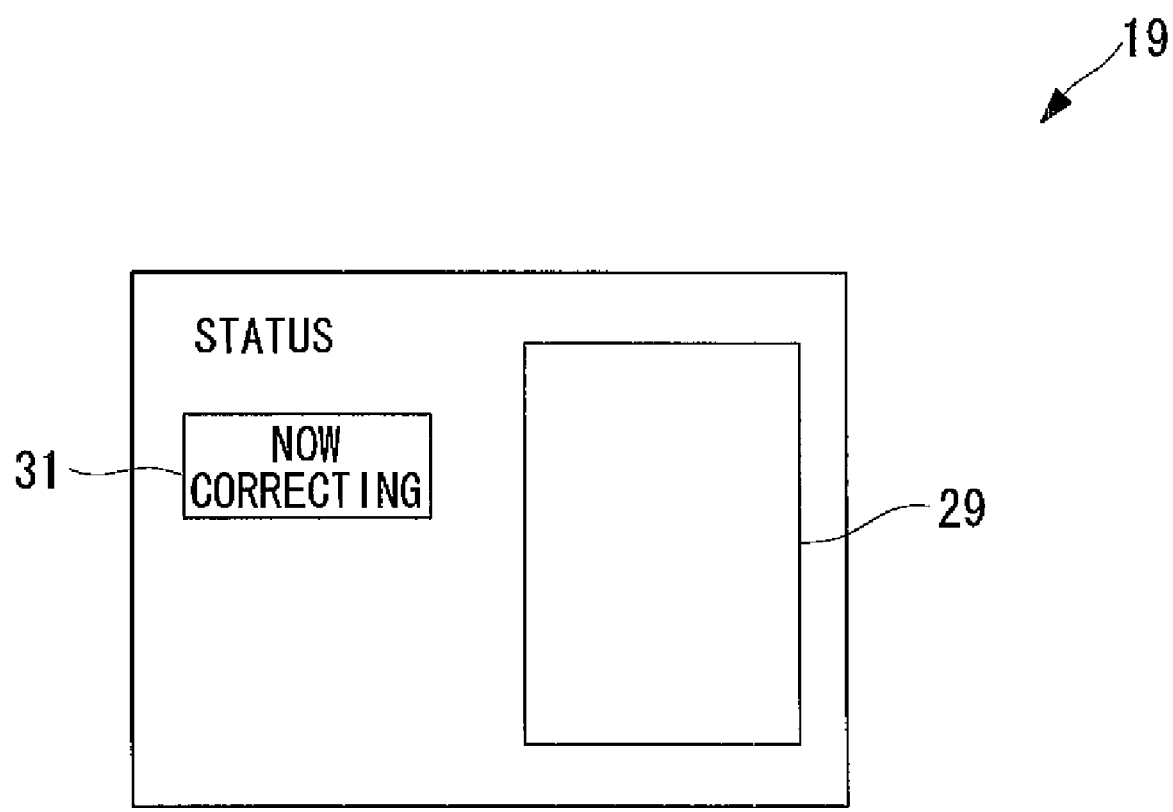
FIG. 4 is a diagram for explaining an image displayed on a display unit in FIG. 1.

FIG. 4 is a diagram for explaining an image displayed on the display unit 19 in FIG. 1

The second image-acquisition device 25 outputs a luminance signal based on the fluorescence image of the specimen S and the marker M. In this embodiment, since the second image-acquisition unit 15 is applied to an example formed of a single second image-acquisition device 25, it is difficult for the second image-acquisition unit 15 to acquire the image of the specimen S and the marker M; however, because a plurality of the second image-acquisition devices 25 are actually used, the images of the specimen S and the marker M can be acquired by the second image-acquisition unit 15.

The luminance signal output from the second image-acquisition device 25 is input to the display unit 19. The display unit 19 creates observation image data based on the input luminance signal and displays a fluorescence observation image 29, as shown in FIG. 4.

On the other hand, a signal related to the control status of the objective lens system 9 is input to the display unit 19 from the driving control unit 17. The display unit 19 displays the control status 31 of the driving control unit 17 based on the signal related to the control status. FIG. 4 illustrates a state in which the display shows "now correcting", indicating that the driving control unit 17 is performing normal operation. In addition to "now correcting", the control status 31 displayed on the display unit 19 can show, for example, "starting correction", indicating that the driving control unit 17 is starting to operate, "error", indicating that the fluorescence image F of the marker M is located outside a controllable region of the driving control unit 17, "warning", indicating that the fluorescence image F of the marker M is approaching an outer edge of the controllable region, and so forth.

A storage unit 35 for storing the image acquired by the first image-acquisition unit 11 and the coordinates of the fluorescence image F of the marker M is provided in the driving control unit 17. Specifically, the storage unit 35 stores data in which the central coordinates of the fluorescence image F calculated by the driving control unit 17 are associated with each image file captured by the first image-acquisition unit 11.

If the central coordinates are displayed in this state, it is possible to visually ascertain the condition of the driving control unit 17. Using the position of the marker M as a reference position, it is also possible to perform image processing so that reference positions in a plurality of images after processing are the same.

According to the configuration described above, when the fluorescence image F of the marker M moves from the first image-acquisition device 21C at the center to the first image-acquisition device 21R at the right side, the detection signal output from the first image-acquisition device 21C at the center disappears, and a new detection signal is output from the first image-acquisition device 21R at the right side. The driving control unit 17 can detect the movement of the specimen based on these changes in the detection signal.

When the fluorescence image F of the marker M moves from the first image-acquisition device 21C at the center to the first image-acquisition device 21R at the right side, the driving control unit 17 can control the image-forming position of the fluorescence image F at the second image-acquisition unit 15 based on the movement of the detected marker M. At this time, since the magnification X of the optical system formed of the objective lens system 9 and the first image-forming lens system 10, the magnification X' of the optical system formed of the objective lens system 9 and the second image-forming lens system 12, the pixel size Y of the first image-acquisition devices 21, and the pixel size Y' of the second image-acquisition device 25 satisfy expression (2) above, the driving control unit 17 can control the fluorescence image F so that it does not move out the second image-acquisition device 25. Accordingly, the second image-acquisition device 25 can acquire the fluorescence image of the marker M, that is, specimen S, in a stationary state.

Because the driving control unit 17 controls the position of the fluorescence image F formed on the second image-acquisition unit 15 by driving and controlling the position of the objective lens system 9, it is possible to examine the specimen in a stationary state while suppressing blurring. The driving control unit 17 drives and controls the position of the objective lens system 9 by calculating the movement of the marker M (specimen S) based on the detection signal of the first image-acquisition unit 11, thus allowing the position of the fluorescence image F formed on the second image-acquisition unit 15 to be controlled. In other words, the driving control unit 17 drives and controls the position of the objective lens system 9 so as to cancel out the calculated amount of movement of the specimen S. Accordingly, the fluorescence image F can be formed at substantially the same position at the second image-acquisition unit 15, even if the marker M (specimen S) moves.

Second Embodiment

Next, a second embodiment of the present invention will be described with reference to FIGS. 5 to 7.

The basic configuration of the examination apparatus of this embodiment is the same as that of the first embodiment, but the configuration of the optical system is different from that of the first embodiment. Therefore, only the vicinity of the optical system in this embodiment will be described using FIGS. 5 to 7, and a description of other elements and so on will be omitted.

Figure 5:
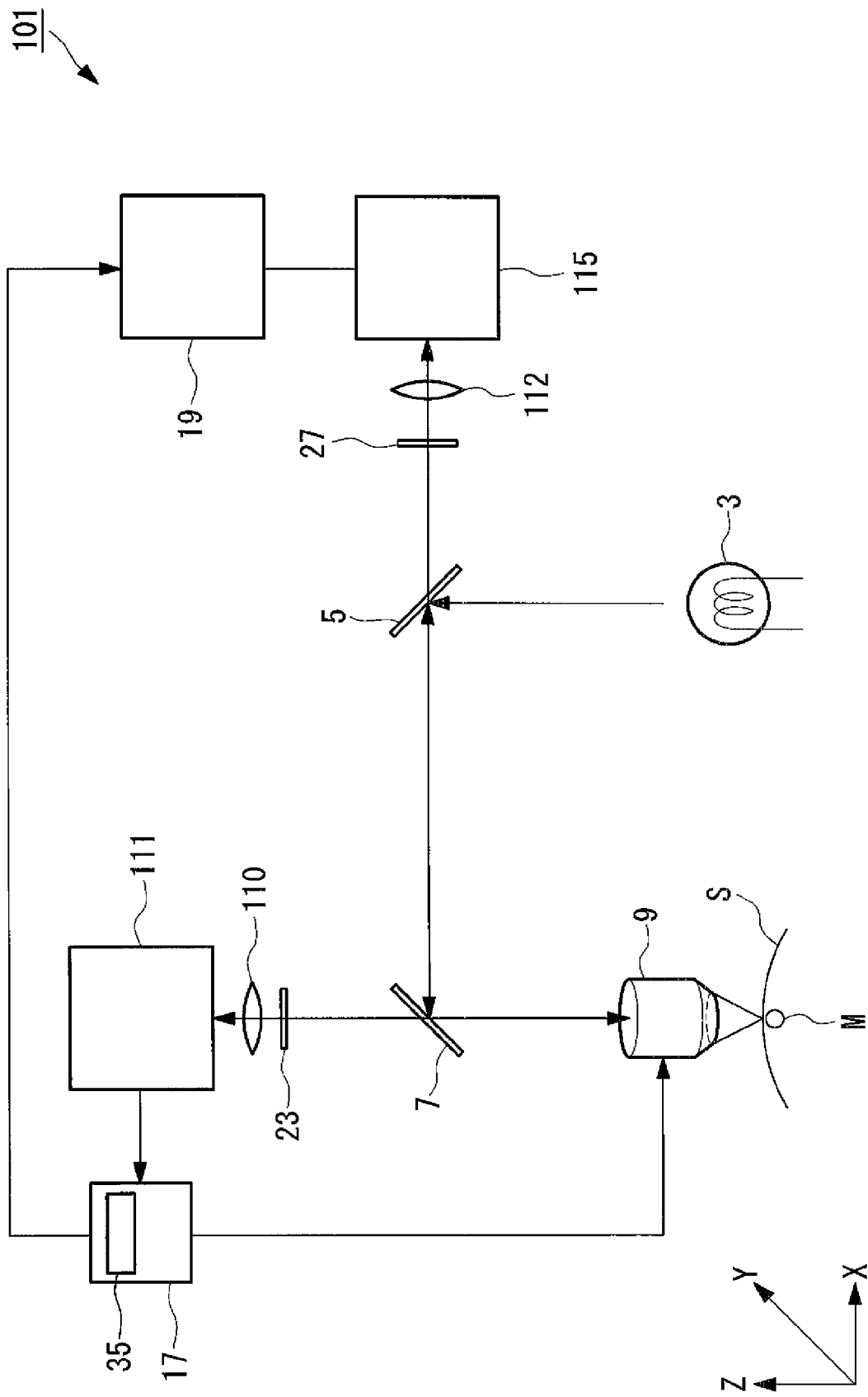
FIG. 5 is a schematic diagram showing the configuration of an examination apparatus according to a second embodiment of the present invention.

FIG. 5 is a schematic diagram showing the configuration of an examination apparatus 101 according to this embodiment.

In this embodiment, elements that are identical to those of the first embodiment are assigned the same reference numerals, and a description thereof shall be omitted.

As shown in FIG. 5, the examination apparatus 101 includes the light source 3, the first dichroic mirror 5, the second dichroic mirror 7, the objective lens system 9, a first image-forming lens system (first optical system) 110, a first image-acquisition unit 111, a second image-forming lens system (second optical system) 112, a second image-acquisition unit 115, the driving control unit 17, and the display unit 19.

The first image-acquisition unit 111 acquires the reflected light from the specimen S and detects the motion of the image of the specimen S formed on the first image-acquisition unit 111. The first image-acquisition unit 111 includes a plurality of first image-acquisition devices 121, such as Charge Coupled Devices (CCDs) (see FIG. 6). The outputs from the first image-acquisition devices 121 are input to the driving control unit 17.

The second image-acquisition unit 115 acquires the reflected light from the specimen S; that is, it acquires an image of the specimen S. The second image-acquisition unit 115 includes a second image-acquisition device 125, such as a CCD (see FIG. 7). The output from the second image-acquisition device 125 is input to the display unit 19.

The pixel size of the first image-acquisition devices 121 and the second image-acquisition device 125 should be substantially the same, and the number or type thereof is not limited.

The first image-forming lens system 110 is a lens system for imaging the fluorescence produced in the specimen S and the marker M onto the first image-acquisition unit 111. The first image-forming lens system 110 is disposed between the second dichroic mirror 7 and the first image-acquisition unit 111.

The first image-forming lens system 110 is not particularly limited; any known lens system may be used so long as it has higher magnification than the second image-forming lens system 112 described later.

Figure 6:
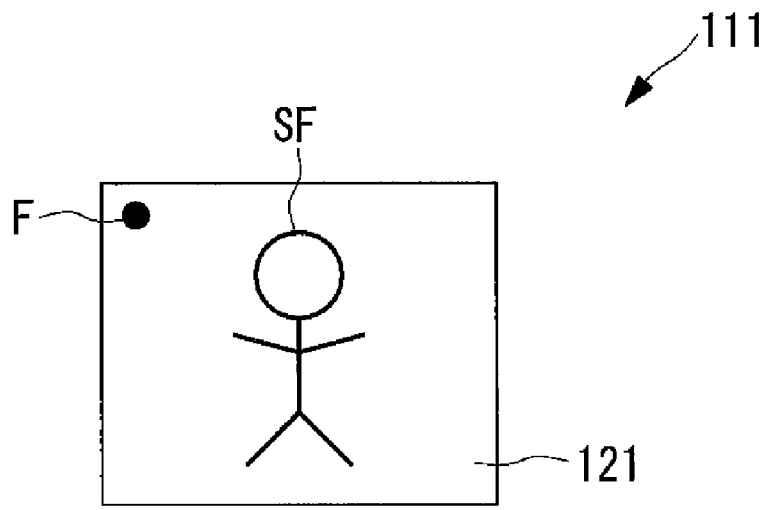
FIG. 6 is a diagram for explaining an image acquired by a first image-acquisition unit in FIG. 5.

FIG. 6 is a diagram for explaining an image acquired by the first image-acquisition unit 111 in FIG. 5. The image acquired by the first image-acquisition unit 111 includes a fluorescence image SF of the specimen S and the fluorescence image F of the marker M. The fluorescence image SF acquired by the first image-acquisition unit 111 is larger than the fluorescence image SF acquired by the second image-acquisition unit 115, which is described later (see FIG. 7).

The second image-forming lens system 112 is a lens system for imaging the fluorescence generated by the specimen S and the marker M onto the second image-acquisition unit 115. The second image-forming lens system 112 is disposed between the first dichroic mirror 5 and the second image-acquisition unit 115.

The second image-forming lens system 112 is not particularly limited; any known lens system may be used so long as it has lower magnification than the first image-forming lens system 110 described above.

Figure 7:
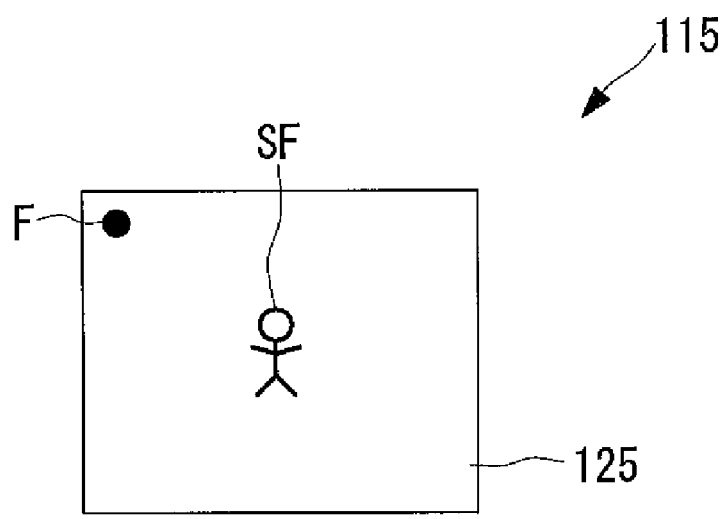
FIG. 7 is a diagram for explaining an image acquired by a second image-acquisition unit in FIG. 5.

FIG. 7 is a diagram for explaining an image acquired by the second image-acquisition unit 115 in FIG. 5. The image acquired by the second image-acquisition unit 115 includes the fluorescence image SF of the specimen S and the fluorescence image F of the marker M. The fluorescence image SF acquired by the second image-acquisition unit 115 is smaller than the fluorescence image SF acquired by the first image-acquisition unit 111 described above (see FIG. 6).

Now, the relationship between a magnification and a pixel size at the first image-acquisition unit 111 and the second image-acquisition unit 115, which is a feature of this embodiment, will be described.

The magnification X2 of the image of the specimen S and the marker M formed at the first image-acquisition unit 111, the magnification X2' of the image of the specimen S and the marker M formed at the second image-acquisition unit 115, the pixel size Y2 of the first image-acquisition devices 121 in the first image-acquisition unit 111, and the pixel size Y2' of the second image-acquisition device 125 in the second image-acquisition unit 115 are set so as to satisfy expression (3) below.

Specifically, the magnification X2 is the magnification of the optical system formed of the objective lens system 9 and the first image-forming lens system 110, and the magnification X2' is the magnification of the optical system formed of the objective lens system 9 and the second image-forming lens system 112. Here, the objective lens system 9 is shared. On the other hand, the magnification of the first image-forming lens system 110 is set to be higher than that of the second image-forming lens system 112. Accordingly, the magnification X2 is higher than the magnification X2' in this embodiment.

On the other hand, as described above, the pixel size Y2 of the first image-acquisition devices 121 is set to be substantially the same as the pixel size Y2' of the second image-acquisition device 125.

Accordingly, in this embodiment, the magnification X2, the magnification X2', the pixel size Y2, and the pixel size Y2' are set so as to satisfy expression (3) above.

Since the operation of the examination apparatus 101 having the above described configuration is the same as that in the first embodiment described above, a description thereof is omitted here.

According to the above configuration, the pixel size Y2 of the first image-acquisition devices 121 and the pixel size Y2' of the second image-acquisition device 125 are substantially the same, and the magnification X2 of the optical system formed of the objective lens system 9 and the first image-forming lens system 110 is larger than the magnification X2' of the objective lens system 9 and the second image-forming lens system 112, thus satisfying conditional expression (3) above, the driving control unit 17 can control the fluorescence image F so that it does not move out of the second image-acquisition device 125. Accordingly, the second image-acquisition device 125 can acquire the fluorescence of the marker M, that is, the specimen S, in a stationary state.

Third Embodiment

Next, a third embodiment of the present invention will be described with reference to FIG. 8.

The basic configuration of the examination apparatus of this embodiment is the same as that of the first embodiment, but the method of controlling the image-forming position of the fluorescence image is different from that of the first embodiment. Therefore, only the method for controlling the image-forming position will be described in this embodiment using FIG. 8, and a description of other elements will be omitted.

Figure 8:
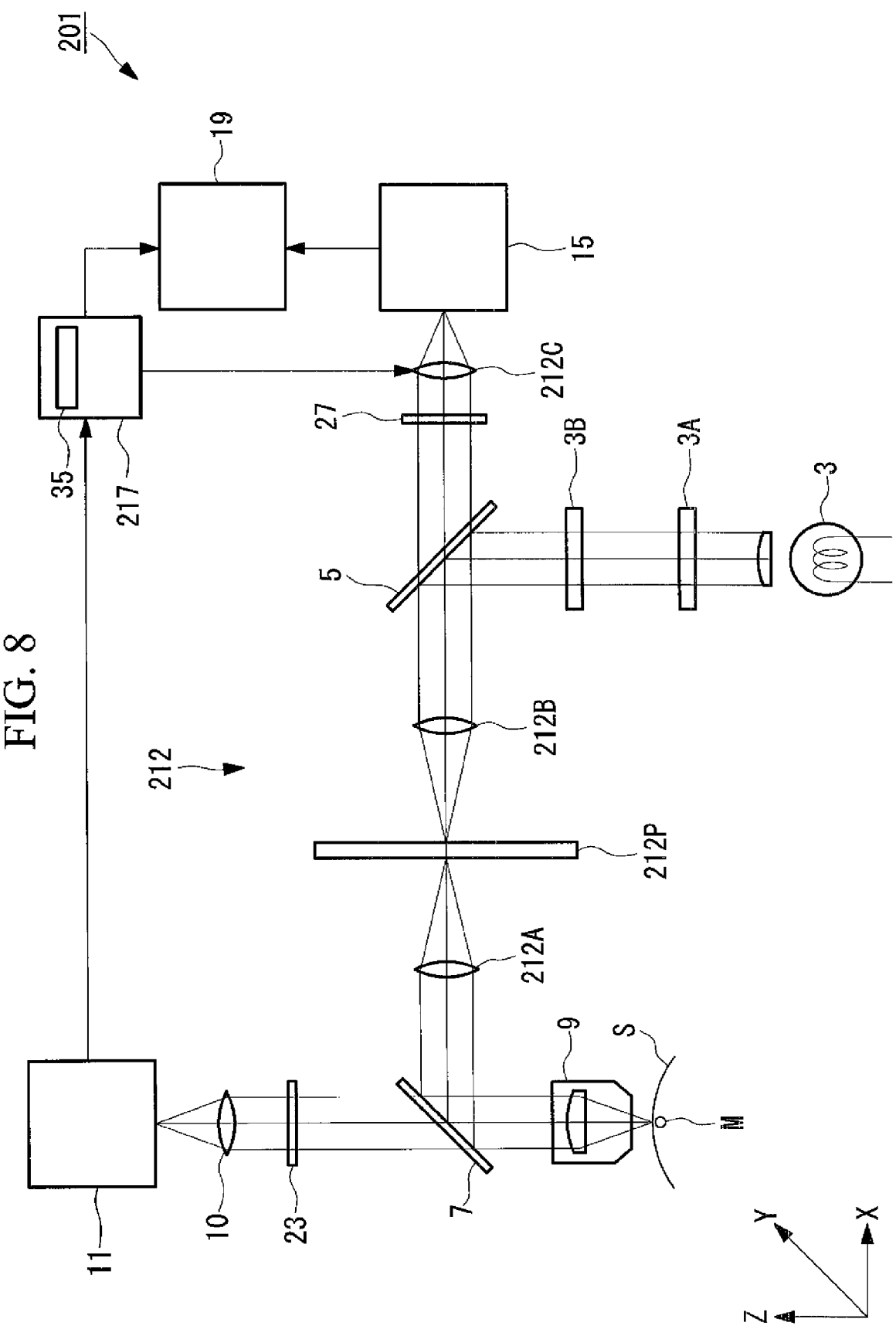
FIG. 8 is a schematic diagram showing the configuration of an examination apparatus according to a third embodiment of the present invention.

FIG. 8 is a schematic diagram showing the configuration of an examination apparatus 201 according to this embodiment.

In this embodiment, elements that are identical to those of the first embodiment are assigned the same reference numerals, and a description thereof shall be omitted.

As shown in FIG. 8, the examination apparatus 201 includes the light source 3, the first dichroic mirror 5, the second dichroic mirror 7, the objective lens system 9, the first image-forming lens system 10, the first image-acquisition unit 11, a second image-forming lens system (second optical system) 212, the second image-acquisition unit 15, a driving control unit (driving unit) 217, and the display unit 19.

A neutral density (ND) filter 3A and an excitation (EX) filter 3B are disposed, in this order from the light source 3, between the light source 3 and the first dichroic mirror 5.

The second image-forming lens system 212 includes a first lens 212A, a pinhole disk 212P, a second lens 212B, and a third lens (second image-forming lens) 212C.

The first lens 212A is a lens for focusing light reflected from the second dichroic mirror 7 onto the pinhole disk 212P. The first lens 212A is disposed between the second dichroic mirror 7 and the pinhole disk 212P.

The pinhole disk 212P is disposed between the first lens 212A and the second lens 212B, and a pinhole, which is a through-hole, is formed in the pinhole disk 212P at a focal point of the first lens 212A.

The second lens 212B is a lens for converting light passing through the pinhole of the pinhole disk 212P to collimated light. The second lens is disposed between the pinhole disk 212P and the first dichroic mirror 5.

The third lens 212C is a lens for imaging fluorescence transmitted through the second absorption filter 27 on the second image-acquisition unit 15. The third lens 212C is disposed between the second absorption filter 27 and the second image-acquisition unit 15. The position of the third lens 212C is controlled by the driving control unit 217.

The driving control unit 217 drives and controls the position of the third lens 212C based on the output from the first image-acquisition unit 11. The outputs of the first image-acquisition devices 21 in the first image-acquisition unit 11 are input to the driving control unit 217. The driving control unit 217 outputs the control status of the third lens 212C to the display unit 19.

Next, the operation of the examination apparatus 201 having the above configuration will be described.

In this embodiment, the operations from distributing the markers M to forming the fluorescence image of the specimen S and a marker M on the first image-acquisition unit 11 and the second image-acquisition unit 15 are substantially the same as those in the first embodiment, and a description thereof is thus omitted here.

Now, a method for controlling an image-forming position of the fluorescence image at the second image-acquisition unit 15 using the driving control unit 217 will be described.

As shown in FIG. 8, when the specimen S moves, the marker M attached to the specimen S moves together therewith. When the marker M moves, the fluorescence image F of the marker M formed on the first image-acquisition unit 11 also moves. A detection signal output from the first image-acquisition unit 11 also changes according to the movement of the fluorescence image F of the marker M.

The driving control unit 217 receives the detection signal and then controls the position of the third lens 212C based on the input detection signal. Specifically, the driving control unit 217 calculates the moving direction of the specimen S based on the change in the input detection signal. Then, based on the calculated moving direction of the specimen S, the driving control unit 217 controls the position of the third lens 212C so that the fluorescence image F of the specimen S is positioned at substantially the center of the second image-acquisition unit 15. Accordingly, the fluorescence image of the specimen S does not move out of the second image-acquisition device 25.

The method for displaying the fluorescence image acquired by the second image-acquisition unit 15 is the same as that in the first embodiment, and a description thereof is thus omitted here.

According to the above configuration, because the driving control unit 217 drives and controls the position of the third lens 212C based on the detection signal of the first image-acquisition unit 11, it is possible to control the position of the fluorescence image F of the marker M formed on the second image-acquisition unit 15. As a result, based on the detection signal of the first image-acquisition unit 11, the driving control unit 217 can cause the fluorescence image F of the marker M to be formed at substantially the same position of the second image-acquisition unit 15. Accordingly, the second image-acquisition unit 15 can acquire the fluorescence image of the marker M, that is, the specimen S, in a stationary state while suppressing blurring.

In addition, the driving control unit 217 may drive and control the position of the third lens 212C, as in the embodiment described above, or it may control the position of the first lens 212A; that is, it is not particularly limited.

Fourth Embodiment

Next, a fourth embodiment of the present invention will be described with reference to FIG. 9.

The basic configuration of the examination apparatus of this embodiment is the same as that of the third embodiment, but the method of controlling the image-forming position of the fluorescence image is different from that of the third embodiment. Therefore, only a method for controlling the image-forming position in this embodiment will be described using FIG. 9, and a description of other elements will be omitted.

Figure 9:
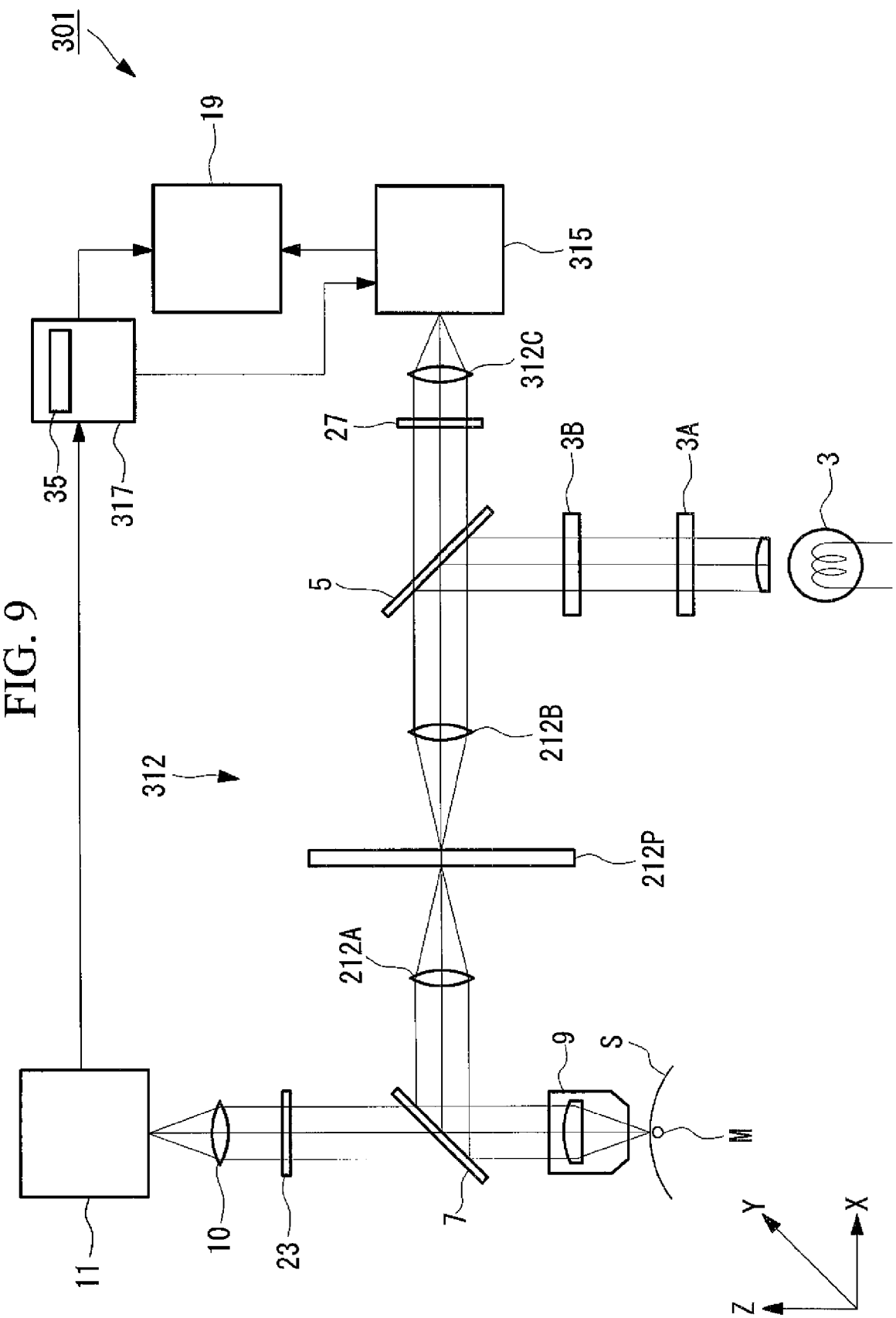
FIG. 9 is a schematic diagram showing the configuration of an examination apparatus according to a fourth embodiment of the present invention.

FIG. 9 is a schematic diagram showing the configuration of an examination apparatus 301 according to this embodiment.

In this embodiment, elements that are identical to those of the third embodiment are assigned the same reference numerals, and a description thereof shall be omitted.

As shown in FIG. 9, the examination apparatus 301 includes the light source 3, the first dichroic mirror 5, the second dichroic mirror 7, the objective lens system 9, the first image-forming lens system 10, the first image-acquisition unit 11, a second image-forming lens system (second optical system) 312, a second image-acquisition unit 315, a driving control unit (driving unit) 317, and the display unit 19.

The second image-forming lens system 312 includes the first lens 212A, the pinhole disk 212P, the second lens 212B, and a third lens 312C.

The third lens 312C is a lens for forming an image of fluorescence transmitted through the second absorption filter 27 on the second image-acquisition unit 315. The third lens 312C is disposed between the second absorption filter 27 and the second image-acquisition unit 315.

The second image-acquisition unit 315 acquires reflected light from the specimen S, that is, it acquires an image of the specimen S. The second image-acquisition unit 315 includes the second image-acquisition device 25, such as a CCD, and the position thereof is controlled by the driving control unit 317.

The driving control unit 317 drives and controls the position of the second image-acquisition unit 315 based on the output from the first image-acquisition unit 11. The outputs of the first image-acquisition devices 21 of the first image-acquisition unit 11 are input to the driving control unit 317. The driving control unit 317 outputs the control status of the second image-acquisition unit 315 to the display unit 19.

Next, the operation of the examination apparatus 301 having the above configuration will be described.

In this embodiment, the operations from distributing the markers M to forming the fluorescence image of the specimen S and a marker M on the first image-acquisition unit 11 and the second image-acquisition unit 315 are substantially the same as those in the first embodiment, and a description thereof is thus omitted here.

Now, a method of controlling an image-forming position of the fluorescence image at the second image-acquisition unit 315 using the driving control unit 317 will be described.

As shown in FIG. 9, when the specimen S moves, the marker M attached to the specimen S moves together therewith. When the marker M moves, the fluorescence image F of the marker M formed on the first image-acquisition unit 11 also moves. A detection signal output from the first image-acquisition unit 11 also changes according to the movement of the fluorescence image F of the marker M.

The driving control unit 317 receives the detection signal and then controls the position of the second image-acquisition unit 315 based on the input detection signal. Specifically, the driving control unit 317 calculates the moving direction of the specimen S based on the change in the input detection signal. Then, based on the calculated moving direction of the specimen S, the driving control unit 317 controls the position of the second image-acquisition unit 315 so that the fluorescence image F of the specimen S is positioned at substantially the center of the first image-acquisition unit 11 and the second image-acquisition unit 315. Accordingly, the fluorescence image of the specimen S does not move from the second image-acquisition device 25.

The method for displaying the fluorescence image acquired by the second image-acquisition unit 315 is the same as that in the first embodiment, and a description thereof is thus omitted here.

According to the above configuration, because the driving control unit 317 drives and controls the position of the second image-acquisition unit 315 based on the detection signal of the first image-acquisition unit 11, it is possible to control the position of the fluorescence image F of the marker M formed on the second image-acquisition device 25. As a result, based on the detection signal of the first image-acquisition unit 11, the driving control unit 317 can cause the fluorescence image F of the marker M to be formed at substantially the same position of the second image-acquisition device 25. Accordingly, the second image-acquisition device 25 can acquire the fluorescence image F of the marker M, that is, the specimen S, in a stationary state while suppressing blurring.

Fifth Embodiment

Next, a fifth embodiment of the present invention will be described with reference to FIGS. 10 to 12.

The basic configuration of the examination apparatus of this embodiment is the same as that of the third embodiment, but the method of controlling the image-forming position of the fluorescence image is different from that of the third embodiment. Therefore, only a method of controlling the image-forming position in this embodiment will be described using FIGS. 10 to 12.

Figure 10:
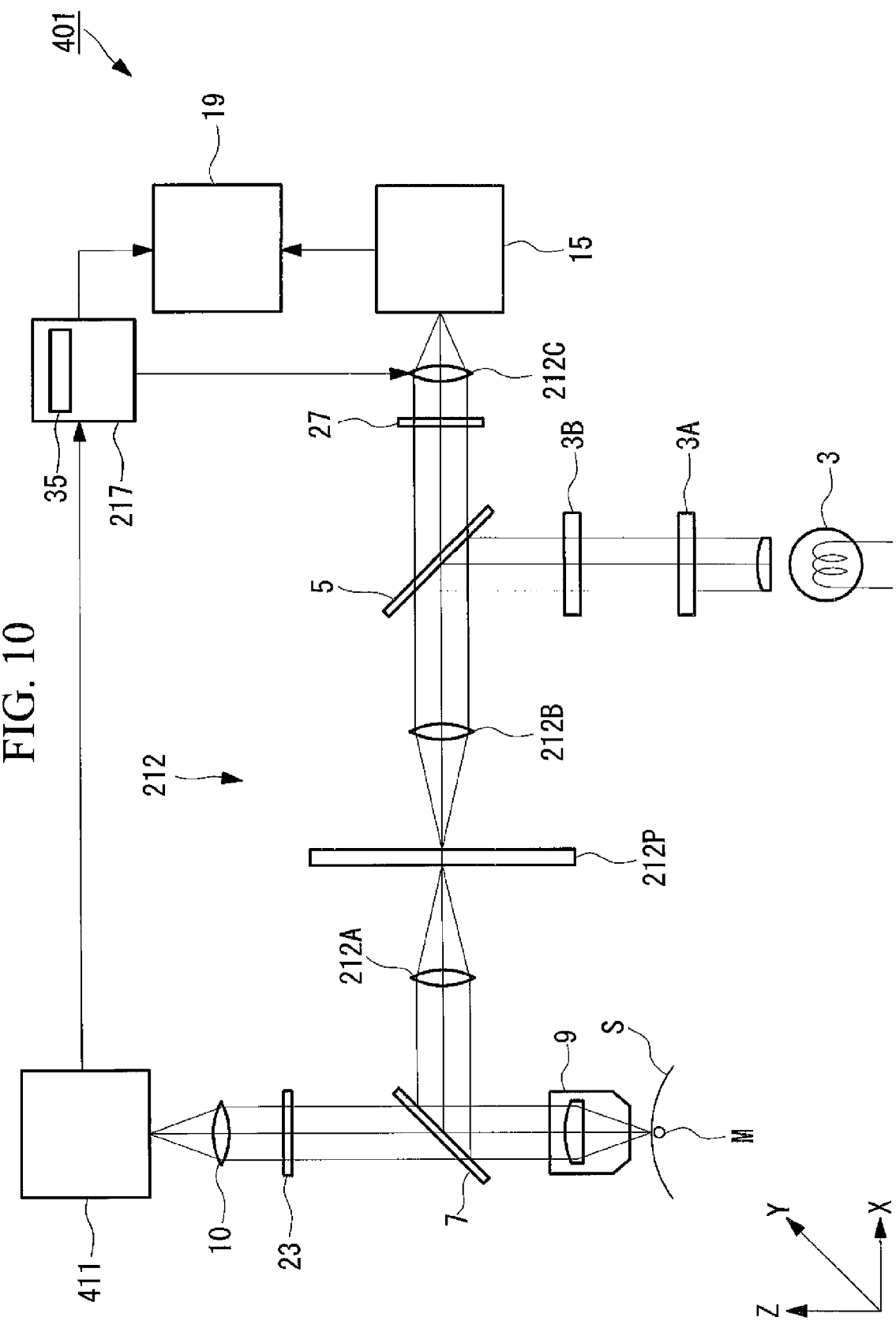
FIG. 10 is a schematic diagram showing the configuration of an examination apparatus according to a fifth embodiment of the present invention.

FIG. 10 is a schematic diagram showing the configuration of an examination apparatus 401 according to this embodiment.

In this embodiment, elements that are identical to those of the third embodiment are assigned the same reference numerals, and a description thereof shall be omitted.

As shown in FIG. 10, the examination apparatus 401 includes the light source 3, the first dichroic mirror 5, the second dichroic mirror 7, the objective lens system 9, the first image-forming lens system 10, a first image-acquisition unit 411, the second image-forming lens system 212, the second image-acquisition unit 15, the driving control unit 217, and the display unit 19.

Figure 11:
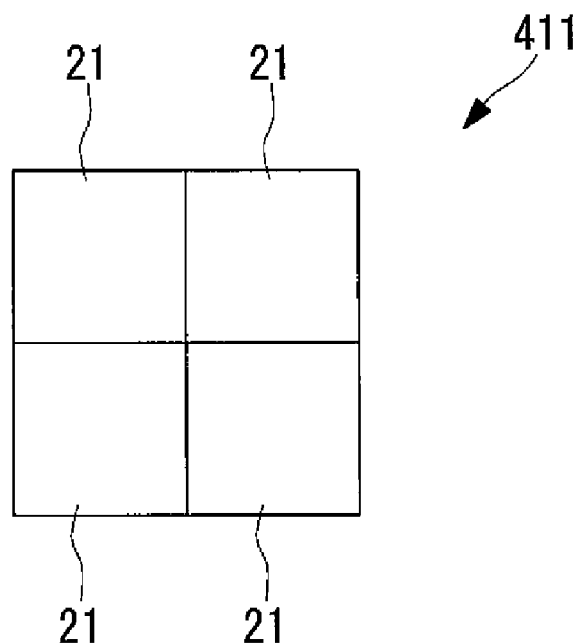
FIG. 11 is a diagram for explaining the placement of first image-acquisition devices in a first image-acquisition unit in FIG. 10.

FIG. 11 is a diagram for explaining the placement of the first image-acquisition devices 21 of the first image-acquisition unit in FIG. 10. FIG. 12 is a diagram for explaining pixel shifting in the first image-acquisition devices 21 in FIG. 11.

The first image-acquisition unit 411 acquires an image of fluorescence produced in the specimen S and detects the fluorescence image of the specimen S formed on the first image-acquisition unit 411. As shown in FIG. 11, the first image-acquisition unit 411 includes a plurality of the first image-acquisition devices 21, such as CCDs. The outputs from the first image-acquisition devices 21 are input to the driving control unit 17. To simplify the description, in this embodiment, four of the first image-acquisition devices 21 are arranged in the form of a matrix.

Figure 12:
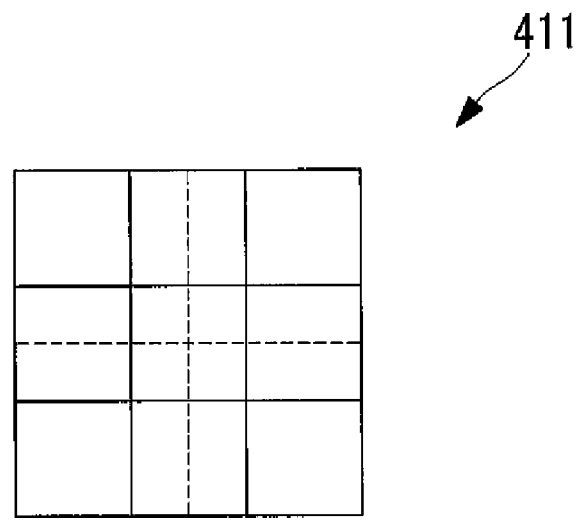
FIG. 12 is a diagram for explaining pixel shifting in the first image-acquisition devices in FIG. 11.

As shown in FIG. 12, the first image-acquisition unit 411 is moved in the X-axis and Y-axis directions by a driving device, such as a piezoelectric device, so that pixels between each of the first image-acquisition devices 21 can be read. In other words, the first image-acquisition devices 21 are configured so as to enable pixel shifting.

Next, the operation of the examination apparatus 401 having the above configuration will be described.

In this embodiment, the operations from distributing the markers M to forming the fluorescence image of the specimen S and a marker M on the first image-acquisition unit 411 and the second image-acquisition unit 15 are substantially the same as those in the first embodiment, and a description thereof is thus omitted here.

In addition, since the method of controlling the image-forming position of the fluorescence image at the second image-acquisition unit 15 using the driving control unit 217 is the same as that in the third embodiment, a description thereof is omitted.

The method of displaying the fluorescence image acquired by the second image-acquisition unit 15 is the same as that in the first embodiment, and a description thereof is omitted.

Now, the pixel shifting in the first image-acquisition unit 411, which is a feature of this embodiment, will be described.

As shown in FIG. 12, when the fluorescence image F of the marker M is detected, the first image-acquisition unit 411 moves the first image-acquisition devices 21 in the X-axis and Y-axis directions. Accordingly, the first image-acquisition unit 411 is able to read the pixels between each of the first image-acquisition devices 21, and the effective pixel size in the first image-acquisition unit 411 is thus reduced.

According to the above configuration, the first image-acquisition unit 411 forms the fluorescence image F of the marker M by shifting the position of the first image-acquisition devices 21 to make the pixel size of the first image-acquisition devices 21 smaller than that of the second image-acquisition device 25. In other words, the first image-acquisition unit 411 can reduce the pixel size of the first image-acquisition devices 21 compared to the second image-acquisition device 25 by performing so-called pixel shifting.

In this state, before the fluorescence image F of the marker M moves out from the second image-acquisition device 25, the fluorescence image F of the marker M on one of the first image-acquisition devices 21 moves onto another first image-acquisition device 21. Accordingly, based on the detection signal of the first image-acquisition unit 411, the driving control unit 217 can prevent the fluorescence image F of the marker M from moving out from the second image-acquisition device 25. As a result, the second image-acquisition unit 15 can acquire the fluorescence image of the marker M, that is, the specimen S in a stationary state.

Sixth Embodiment

Next, a sixth embodiment of the present invention will be described with reference to FIGS. 13 to 15.

The basic configuration of the examination apparatus of this embodiment is the same as that of the third embodiment, but the method of controlling the image-forming position of fluorescence image is different from that of the third embodiment. Therefore, only the method of controlling the image-forming position in this embodiment will be described using FIGS. 13 to 15, and a description of other elements and so on will be omitted.

Figure 13:
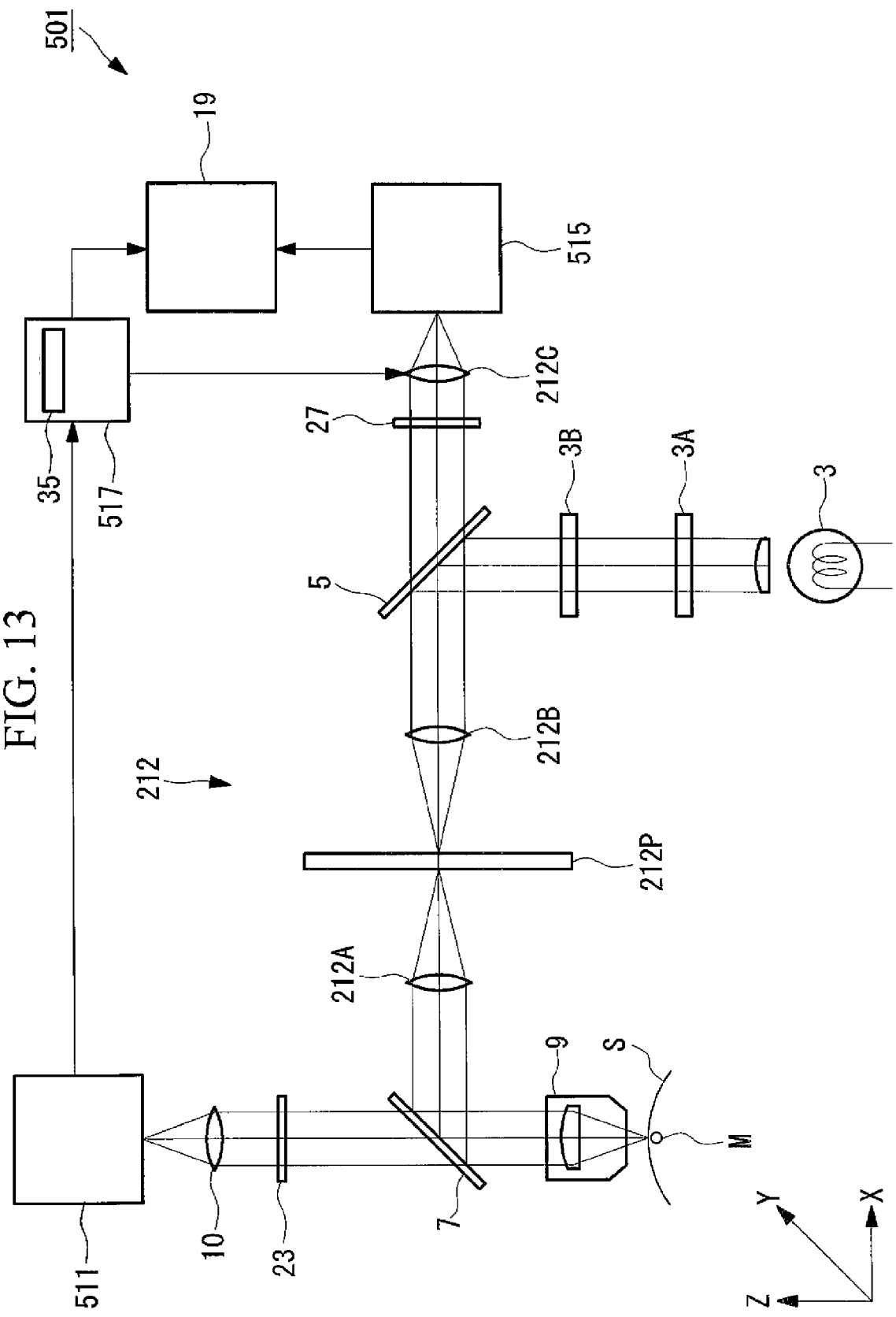
FIG. 13 is a schematic diagram showing the configuration of an examination apparatus according to a sixth embodiment of the present invention.

FIG. 13 is a schematic diagram showing the configuration of an examination apparatus 501 according to this embodiment.

In this embodiment, elements that are identical to those of the third embodiment are assigned the same reference numerals, and a description thereof shall be omitted.

As shown in FIG. 13, the examination apparatus 501 includes the light source 3, the first dichroic mirror 5, the second dichroic mirror 7, the objective lens system 9, the first image-forming lens system 10, a first image-acquisition unit 511, the second image-forming lens system 212, a second image-acquisition unit 515, the driving control unit 517, and the display unit 19.

Figure 14:
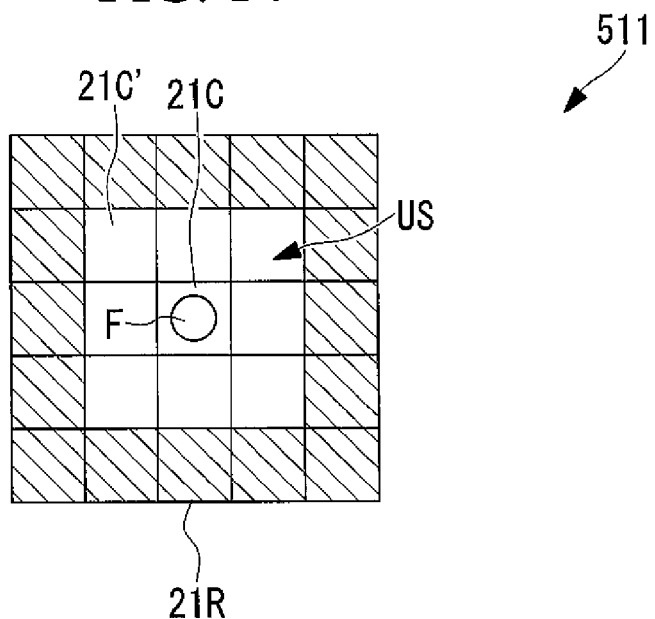
FIG. 14 is a diagram for explaining the configuration of first image-acquisition devices in a first image-acquisition unit in FIG. 13.

FIG. 14 is a diagram for explaining the configuration of the first image-acquisition devices 21 in the first image-acquisition unit 511 in FIG. 13.

The first image-acquisition unit 511 acquires an image of fluorescence produced in the specimen S and detects the movement of the fluorescence image of the specimen S formed on the first image-acquisition unit 511. As shown in FIG. 14, the first image-acquisition unit 511 includes a plurality of the first image-acquisition devices 21, such as CCDs. The outputs of the first image-acquisition devices 21 are input to the driving control unit 517. To simplify the description, in this embodiment, 25 of the first image-acquisition devices 21 are arranged in the form of a matrix.

Here, the first image-acquisition unit 511 is divided, by the driving control unit 517, into the first image-acquisition devices 21 belonging to a dead zone (first device region) US that is formed of a first image-acquisition device 21C at the center and first image-acquisition devices 21C' adjacent thereto, and surrounding first image-acquisition devices 21R around the periphery thereof. In FIG. 14, the surrounding first image-acquisition devices 21R are indicated by shading.

Figure 15:
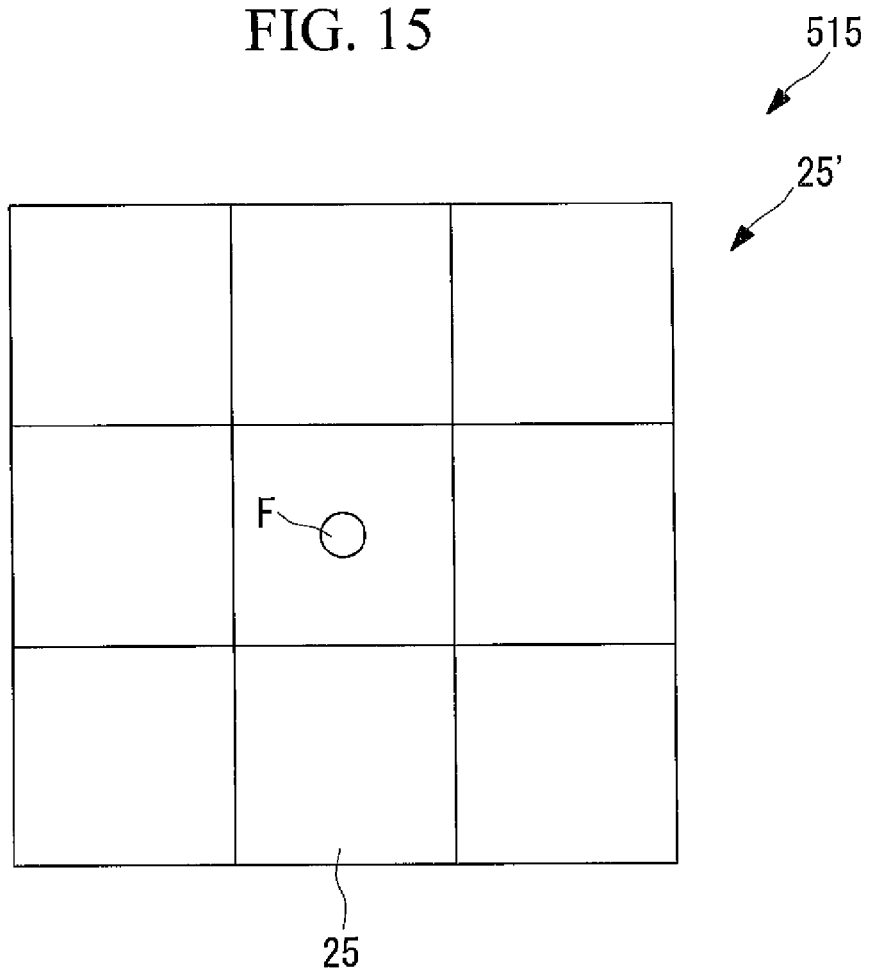
FIG. 15 is a diagram for explaining the configuration of second image-acquisition devices in a second image-acquisition unit in FIG. 13.

FIG. 15 is a diagram for explaining the configuration of the second image-acquisition devices 25 in the second image-acquisition unit 515 in FIG. 13.

The second image-acquisition unit 515 acquires the reflected light from the specimen S, that is, it acquires an image of the specimen S.

As shown in FIG. 15, the second image-acquisition unit 515 includes a plurality of the second image-acquisition devices 25, such as CCDs. The outputs from the second image-acquisition devices 25 are input to the display unit 19. To simplify the description, in this embodiment, nine second image-acquisition devices 25 are disposed.

Here, the outputs from the nine image-acquisition devices 25 are treated as an output from a single virtual image-acquisition device 25' (second device region) including the nine image-acquisition devices 25.

When the total pixel size of the first image-acquisition devices 21 belonging to the dead zone US is Y4, the pixel size of the virtual image-acquisition device 25' is Y4', the magnification of the image formed on the first image-acquisition unit 511 is X4, and the magnification of the image formed on the second image-acquisition unit 515 is X4', then the pixel size Y4, the pixel size Y4', the magnification X4, and the magnification X4' satisfy expression (4) below.

Next, the operation of the examination apparatus 501 having the above configuration will be described.

In this embodiment, the operations from distributing the markers M to forming the fluorescence image of the specimen S and a marker M on the first image-acquisition unit 511 and the second image-acquisition unit 515 are substantially the same as those in the first embodiment, and a description thereof is thus omitted here.

Now, a method of controlling the image-forming position of the fluorescence image of the second image-acquisition unit 515 by the driving control unit 517 will be described.

When the specimen S moves, the marker M attached to the specimen S moves together therewith. As shown in FIG. 14, when the marker moves, the fluorescence image F of the marker M formed on the first image-acquisition unit 511 also moves. A detection signal output from the first image-acquisition unit 511 also changes according to the movement of the fluorescence image F of the marker M.

The driving control unit 517 receives the detection signal and controls the position of the third lens 212C based on the input detection signal.

Specifically, as shown in FIG. 14, when the fluorescence image F moves from the first image-acquisition device 21C at the center to the first image-acquisition devices 21C' adjacent thereto, the driving control unit 517 does not control the position of the third lens 212C.

When the fluorescence image F moves from the first image-acquisition devices 21C and 21C' respectively positioned at the center and adjacent thereto (the first image-acquisition devices 21 in the dead zone) to the surrounding first image-acquisition devices 21R, the driving control unit 517 controls the position of the third lens 212C. In other words, the driving control unit 517 calculates the moving direction of the specimen S based on the output from the first image-acquisition unit 511. Then, based on the calculated moving direction of the specimen S, the driving control unit 517 controls the position of the third lens 212C so that the fluorescence image F is positioned at substantially the center of the second image-acquisition unit 515. Accordingly, the fluorescence image of the specimen S does not move from the second image-acquisition devices 25.

This embodiment is not particularly limited. The image-forming position at the second image-acquisition unit 515 may be controlled by setting the dead zone US in the first image-acquisition unit 511, as in the embodiment described above, or it may be selectively controlled by setting or not setting the dead zone US by switching a control mode.

The method of displaying the fluorescence image acquired by the second image-acquisition unit 515 is the same as that in the first embodiment, and a description thereof is thus omitted here.

According to the above configuration, when the fluorescence image F moves from the dead zone US to the surrounding first image-acquisition devices 21R, the detection signals output from the first image-acquisition devices 21C and 21C' in the dead zone US disappear, and new detection signals are output from the surrounding first image-acquisition devices 21R. Because the value obtained by dividing the pixel size Y4 in the dead zone US by the magnification X4 is smaller than the value obtained by dividing the pixel size Y4' of the virtual image-acquisition device 25' by the magnification X4', the driving control unit 517 can control the fluorescence image F so that it does not move out the virtual image-acquisition device 25'. The virtual image-acquisition device 25' outputs a single luminance value based on the luminance of the fluorescence image of the specimen S formed by the second image-acquisition devices 25. Accordingly, the second image-acquisition unit 515 is capable of acquiring the fluorescence image F of the marker M, that is, the specimen S, in a stationary state while suppressing blurring.

What is claimed is:

1. An examination apparatus comprising:
   a first optical system and a second optical system configured to image light produced in a specimen;
   a first image-acquisition unit provided with a plurality of first image-acquisition devices configured to detect an image formed by the first optical system;
   a second image-acquisition unit provided with a second image-acquisition device configured to acquire an image formed by the second optical system; and
   a driving unit configured to cause the image to be formed by the second optical system to remain at substantially a same position based on a detection signal of the first image-acquisition unit, wherein
   a magnification X of the first optical system, a magnification X' of the second optical system, a pixel size Y of the first image-acquisition devices, and a pixel size Y' of the second image-acquisition device satisfy expression (1) below:

$$Y/X < Y'/X' \tag{1}$$

2. An examination apparatus according to claim 1, wherein
   the magnification of the first optical system and the magnification of the second optical system are substantially the same; and
   the pixel size of the first image-acquisition devices is smaller than the pixel size of the second image-acquisition device.

3. An examination apparatus according to claim 2, wherein
   the first image-acquisition unit detects the image formed by the first optical system by shifting positions of the first image-acquisition devices.

* * * * *